United States Patent [19]
Fujike et al.

[11] Patent Number: 5,654,833
[45] Date of Patent: Aug. 5, 1997

[54] DEVICE FOR VARYING BRAKING FORCE

[75] Inventors: Hiroshi Fujike, Kawasaki; Yasuhiro Izumi, Yokohama; Tateki Nakamura, Tokyo, all of Japan

[73] Assignee: Canon Kabushiki Kaisha, Tokyo, Japan

[21] Appl. No.: 725,350

[22] Filed: Oct. 1, 1996

Related U.S. Application Data

[63] Continuation of Ser. No. 439,107, May 11, 1995, abandoned.

[30] Foreign Application Priority Data

| May 16, 1994 | [JP] | Japan | 6-127044 |
| May 16, 1994 | [JP] | Japan | 6-127045 |
| Jul. 15, 1994 | [JP] | Japan | 6-186464 |
| Nov. 1, 1994 | [JP] | Japan | 6-294022 |

[51] Int. Cl.$^6$ .................. G02B 7/02; G02B 15/14
[52] U.S. Cl. ............... 359/822; 359/823; 359/694; 359/697; 396/103; 396/137
[58] Field of Search .................. 359/696, 694, 359/697, 698, 703, 704, 822, 823, 824, 830; 396/103, 137; 188/267

[56] References Cited

U.S. PATENT DOCUMENTS

| 5,177,524 | 1/1993 | Tanaka | 396/103 |
| 5,239,415 | 8/1993 | Imanari et al. | 359/694 |
| 5,418,650 | 5/1995 | Imanari et al. | 359/823 |
| 5,453,879 | 9/1995 | Ishii et al. | 359/694 |
| 5,573,088 | 11/1996 | Daniels | 188/267 |

FOREIGN PATENT DOCUMENTS

| 0227917 | 7/1987 | European Pat. Off. | G11B 15/43 |
| 2551596 | 4/1977 | Germany | G02B 7/10 |
| 4104772 | 8/1991 | Germany | G02B 7/04 |

OTHER PUBLICATIONS

Patent Abstracts of Japan, vol. 007, No. 088 (E-170) Apr. 12, 1983 and JP-A-58 015448, Abstract only.

Patent Abstracts of Japan, vol. 017, No. 671 (M-1525) Dec. 10, 1993 and JP-A-05223135, Abstract only.

*Primary Examiner*—Loha Ben
*Attorney, Agent, or Firm*—Fitzpatrick, Cella, Harper & Scinto

[57] ABSTRACT

Disclosed is a device that comprises a cylindrical member, a viscous member which is applied to the cylindrical face of the cylindrical member to provide a viscous layer, a contact member, which contacts the cylindrical face, and a contact area varying member which varies the contact area, wherein the contact area is variable to change braking force for revolutions.

31 Claims, 12 Drawing Sheets

5,654,833

DEVICE FOR VARYING BRAKING FORCE

This application is a continuation of application Ser. No. 08/439,107 filed May 11, 1995, now abandoned.

BACKGROUND OF THE INVENTION

1. Field of the Invention

The present invention relates to a braking device, a controller, an operating force controller, and an optical device that can vary braking force.

2. Related Background Art

FIG. 10 is a diagram showing the principle of a first braking device of a first conventional art example. This braking device comprises a cylindrical member 1 that is externally driven and a belt-shaped member 27 that has one end fixed and that is so positioned that it is wound around the cylindrical member 1.

When the other end (free end) of the belt-shaped member 27 that is not fixed is pulled downward, as is indicated by an arrow in FIG. 10, the belt-shaped member 27 is pressed onto the external surface of the cylindrical member 1. The contact of the cylindrical member 1 with the belt-shaped member 27 generates force due to friction that acts as a braking torque.

FIG. 11 is a perspective view of a second braking device of a second conventional art example in which a braking torque is proportional to the number of revolutions and is variable. In this braking device, disks 29 that are mounted on a rotary shaft 28 are provided in a Newtonian fluid 2 that is held in a sealed container 33. As the rotary shaft 28 is rotated by an external device, shearing strain is induced in the Newtonian fluid 2 between semicircular disks 31, which are fitted around a control shaft 32 that is provided in parallel to the rotary shaft 28, and the disks 29, so that a braking torque that is proportional to the rotation of the rotary shaft 28 is generated.

Since, from the view of rotation, the value of the braking torque at a specific number of revolutions is proportional to an area where the disks 29 and the semicircular disks 31 overlap, the torque value can be adjusted by rotating the control shaft 32 and changing the overlap area.

As the braking device employs the resistance of the Newtonian fluid 2 that occurs due to shear strain force in proportion to the shear strain speed to generate the braking force, this braking force acts so that it is proportional to the number of revolutions. The torque-revolutions characteristic of the braking device is represented together with that of a general prime mover in FIG. 12. When the torque-revolutions characteristic in FIG. 12 is compared with the torque-revolutions characteristic of a prime mover in the first conventional art example in FIG. 13, it is apparent that the difference between inclinations in the graph for the prime mover and the braking device in the second conventional art example is substantially increased in comparison with those for the first conventional art example shown in FIG. 10.

Thus, with the above described arrangement, constant-speed operation of an entire system can be improved without requiring a speed detector and a feedback means. Further, since the operation speed corresponds to an intersection of lines in a graph for the braking torque-revolution characteristic of the braking device and the driving torque-revolution characteristic of the prime mover, the angle of rotation of the control shaft 32 is changed to alter the proportional coefficient for the braking torque-revolution characteristic of the braking device, thus providing an arbitrary driving speed. In other words, the braking device serves as a speed control means.

In the first conventional art example, however, the braking force generation source is derived from the friction that occurs between solid objects, i.e., a cylindrical member and a belt-shaped member, and the following problems occur.

(1) The first conventional art example is not appropriate for constant-speed rotation.

FIG. 13 is a graph showing the torque-revolutions characteristics for the first conventional braking device and a prime mover that is externally coupled with the braking device. As is shown in FIG. 13, since, in the braking device, the braking torque is caused by friction that occurs between the solid objects, a constant braking torque is generated, regardless of the number of revolutions.

On the other hand, a characteristic of a general prime mover, such as a motor, is that an internal loss causes a slight reduction in a generated torque as the number of revolutions is increased.

Consider a case where this braking device is coupled with a prime mover. Supposing that the braking device and the prime mover are rotated at revolutions $V_1$, as is shown in FIG. 13, as the braking torque of the braking device is higher than the driving torque of the prime mover, the speed is decreased. When they are rotated at revolutions $V_2$, however, the driving torque is larger than the braking torque.

Therefore, in a case where the braking device is linked to the prime mover, when the number of revolutions is $V_0$, the driving torque of the prime mover and the braking torque of the braking device are balanced. At this time, the greater the inclinations for the characteristic of the braking device and for the characteristic of the prime mover, the more the torque, for which the specific number of revolutions is returned to the revolution number $V_0$, is increased. The number of revolutions therefore recovers to the vicinity of the revolution number $V_0$ even when there is a disturbance, and the first conventional art example is therefore appropriate for constant-speed rotation.

However, because in principle the braking torque of the first conventional braking device does not depend on the number of revolutions and the difference between the inclinations in graphs for the braking characteristic and the prime mover's characteristic can not be great, the recovery to constant-speed rotation is insufficient in most cases. Thus, in a machine for which constant-speed operation is required, an electric feedback is usually employed, instead of the braking device in the first conventional art, to change the torque-revolutions characteristic of the prime mover. To do this, however, expensive revolution detection means and feedback means must be provided. Further, as the magnitude of a feedback signal is small during low-speed operation, the feedback signal can not be precisely transmitted due either to the noise produced by an electric feedback means, or to the play in a mechanical feedback means, and speed constancy is unsatisfactory.

For an application, such as the zooming operation of a zoom lens, where it is required to maintain a constant speed as it is manipulated by a person, the improvement of the torque-revolution characteristic for the operating force exerted by an operator, who corresponds to a prime mover, is equivalent to the effort that is required of the operator. Therefore, in order to increase the operability level, no way is available other than the enhancement of the speed constancy that is derived from the improvement of the characteristic of the braking device, and a braking device is demanded for which the braking torque becomes greater in consonance with an increase in the number of revolutions.

Further, in the braking device in the first conventional art example that employs the force that is generated by friction between solid objects, stick-slip easily occurs during the low-speed operation and speed constancy is deteriorated.

(2) The braking device in the first conventional art example is not appropriate for a control section for which a high operability level and the perception of a preferable sensation by an operator are required.

For an operational section, such as a zooming section of a zoom lens for a television camera, for which a high operability level and the perception of a preferable sensation by an operator are required, a breaking device for which the operating force is variable has not yet been provided. When a sensory test was conducted with a control section, of which the operating force is fixed and for which the operability and the sensation that is experienced by an operator are excellent, and its torque-revolution characteristic was measured, the torque was increased in proportion to the number of revolutions. From this result, it is assumed that the increase of the operating force in proportion to operation speed is necessary in order to provide a high operability level and the perception of a desirable sensation by an operator. Because, as is described in (1) above, it is assumed that the speed constancy of a system, which consists of the control section that has this characteristic and the human efforts, greatly influences the operability level and the perception of an operational sensation. In the above conventional art, even though the operating force is variable, it is almost constant regardless of the operation speed, and its operability level and the sensation that is perceived by an operator are not preferable. This was confirmed by the results of the sensory test.

(3) Wear in members occurs.

Since the braking torque is generated by the rubbing together of solid objects, i.e., the cylindrical member and the belt-shaped member, both the shaft and the belt-shaped member wear out in time. Therefore, periodical maintenance and replacement of these items are required.

The second conventional art example has the following problems.

(4) A sealing mechanism is required.

As the second conventional art example is constructed by sealing Newtonian fluid in a container, sealing mechanisms 30 and 34 need to be located around the rotary shaft and the control shaft to prevent leakage of the Newtonian fluid. Since the shaft of the general sealing mechanism is pressed against by a flexible member, a large amount of friction occurs from the rubbing together of solid objects. Due to this friction, the braking torque in the second conventional art example, as well as in the first, does not depend on the number of revolutions. The feature whereby the braking torque of the braking device is proportional to the number of revolutions is lost, while the braking torque is little decreased from its constant value and the small torque value side of a braking torque control width is limited. This is equivalent to the braking torque at revolution 0 that is comparatively large, as is shown in FIG. 12.

(5) The structure in the second conventional art example is complicated.

The structure of the second conventional art example is more complicated than that of the first conventional art example. This results in an increase in manufacturing costs. Further, although the braking torque is reduced when bubbles occur in the Newtonian fluid, it is difficult to prevent the occurrence of bubbles during assembly because of the complicated structure.

SUMMARY OF THE INVENTION

It is therefore a first object of the present invention to provide a compact device that can vary an operating force.

It is a second object of the present invention to provide a lens-barrel to which the above described device is applied.

To achieve the above objects, a device according to the present invention comprises:

a cylindrical member;

a viscous member, which is applied to a cylindrical face of the cylindrical member to provide a viscous layer;

a contact member, which contacts the cylindrical face; and a contact area size varying member capable of varying a contact area, wherein the cylindrical member and the contact member are rotated relative to each other in order to provide a desirable rotation force and an operating force.

Other objects and features of the present invention will become apparent during the course of the following description.

DETAILED DESCRIPTION OF THE PREFERRED EMBODIMENTS

Figure 1:
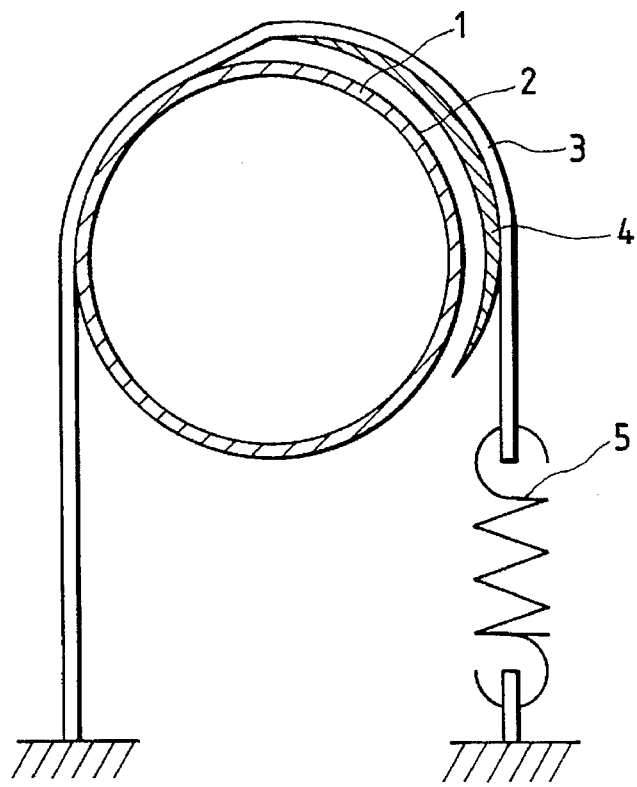
FIG. 1 is a cross sectional view of a device according to the present invention.

The preferred embodiments of the present invention will now be described while referring to the accompanying drawings. In FIG. 1, a horizontal cross sectional view of a braking device according to the present invention, taken perpendicularly to a rotary shaft, illustrates most obviously the feature of the present invention.

A cylindrical member 1 is rotated via a drive device (not shown) and a Newtonian fluid (a viscous liquid) 2 is applied to the external surface of the cylindrical member 1. The Newtonian fluid 2 is a viscous liquid; oil is a specific example. When it is difficult to retain the Newtonian fluid 2 on the external cylindrical surface, it is desirable that a Newtonian fluid in a paste form be employed to increase holding power. Grease is a specific example of such a paste material.

In FIG. 1, a thin plate 3, a member that is located around the cylindrical face, has one end fixed while the other end is secured to a flexible member 5. A spring or a piece of rubber is employed as the flexible member 5. It is possible to replace the flexible member 5 and the thin plate 3 with a single member by employing a flexible material, such as rubber, as the thin plate 3.

A spacer 4 is held so that it is not in contact with the cylindrical member 1 and the Newtonian fluid 2. The spacer 4 is supported rotatably around a center of the cylindrical member 1 so that it can change the area where the thin plate 3 contacts the Newtonian fluid 2 and can thereby alter the torque.

Although in the illustrated example the spacer 4 is held rotatably around the center of the cylindrical member 1, the manner in which the spacer 4 is supported can be arbitrarily determined so long as the area where the thin plate 3 contacts the Newtonian fluid 2 can be varied. Further, the plate 3 need not necessarily be thin as long as the plate 3 can be put around the cylindrical member 1.

When the cylindrical member 1 is rotated by the external force while a part of the thin plate 3 is in contact with the Newtonian fluid 2, as is shown in FIG. 1, shearing strain is induced in the Newtonian fluid 2. At this time, because of the property of the Newtonian fluid 2, a force that is proportional to the speed of the shearing strain generates between the cylindrical member 1 and the thin plate 3. Since the shearing strain speed is proportional to the number of rotations of the cylindrical member 1, as a consequence, the braking device generates a braking torque that is proportional to the number of rotations of the cylindrical member 1.

As the spacer 4 is rotated around the center of the cylindrical member 1 so as to move the thin plate 3 away from the external surface of the cylindrical member 1, the area where the thin plate 3 contacts the Newtonian fluid 2 is changed. At this time, because of the property of the Newtonian fluid 2, the braking torque of the braking device is changed in proportion to the contact area. The flexible member 5 is employed to compensate for the extra length of the thin plate 3 that is generated due to the change in the contact area.

Although the explanation that has been given while referring to FIG. 1 is based on the assumption that the cylindrical member 1 is rotated and that the thin plate 3 that is provided around the cylindrical surface is stationary, the same effect can be obtained when the cylindrical member 1 is stationary and the member 3 is rotated around it. Further, when both the cylindrical member 1 and the member 3 that is around it are moved, the same effect can be obtained as long as they are rotated relative to each other.

Figure 2:
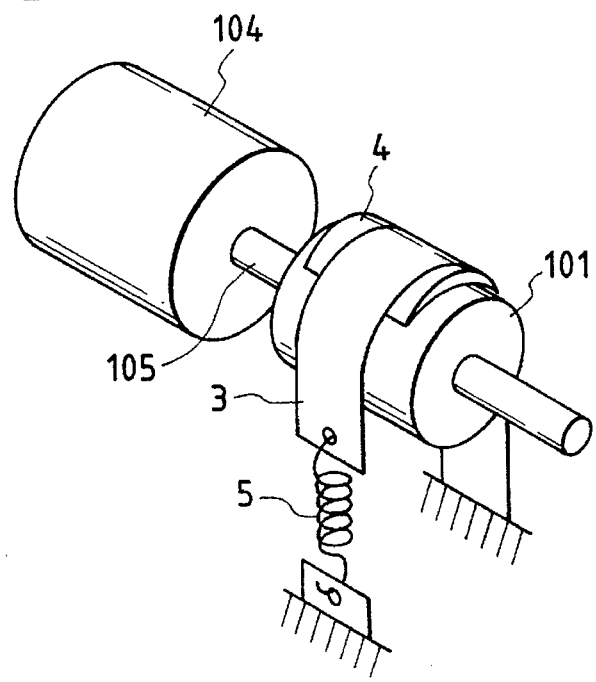
FIG. 2 is a perspective view illustrating one embodiment according to the present invention.

FIG. 2 is a perspective view illustrating another embodiment of the present invention. As the same reference numbers that are used in FIG. 1 are used to denote identical or corresponding components in FIG. 2, no explanation of the components will be given. A braking device that is structured as is shown in FIG. 1 is coupled with a prime mover 104 by a shaft 105. Although in FIG. 2 the braking device 101 and the prime mover 104 are coupled directly, they may be linked via a driving force transmission means such as reduction gears. The prime mover is, for example, a motor, an engine, or a turbine.

Figure 3:
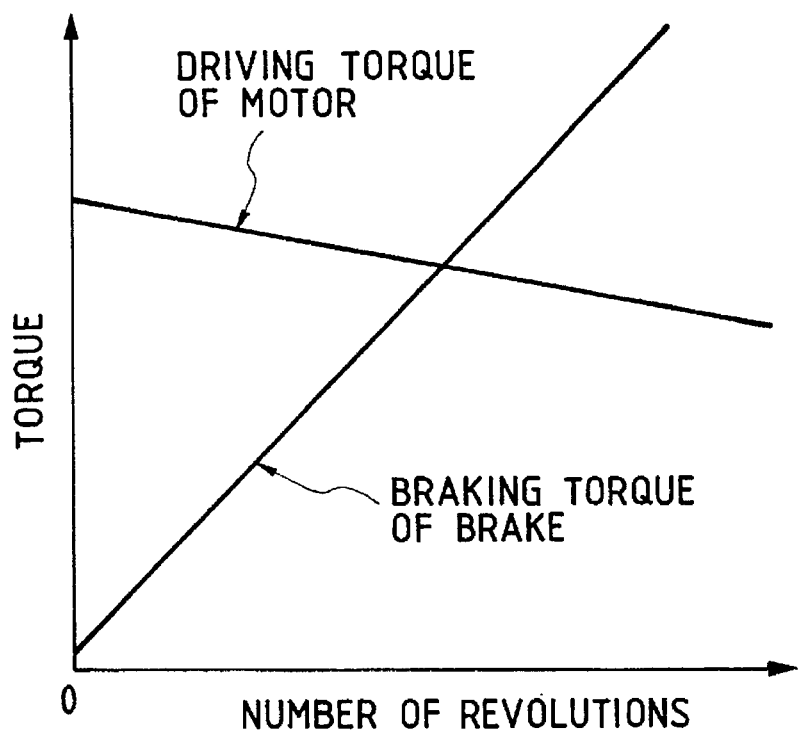
FIG. 3 is a graph showing the relationship between the number of revolutions and a torque of the device shown in FIG. 2.

A graph in FIG. 3 shows the torque-revolutions characteristics for the braking device and the prime mover in FIG. 2. The number of revolutions at the intersection of the line that represents the braking torque characteristic of the braking device and the line that represents the generated torque characteristic of the prime mover corresponds to the number of revolutions of the shaft 105. Since, in the braking device 101, the variation in the area where the member 3, which is provided externally around the cylindrical member 1, contacts the Newtonian fluid 2 results in a change in the inclination of the line in FIG. 3 for the torque-revolutions characteristic, the number of revolutions of the shaft 105 can be altered.

Figure 11:
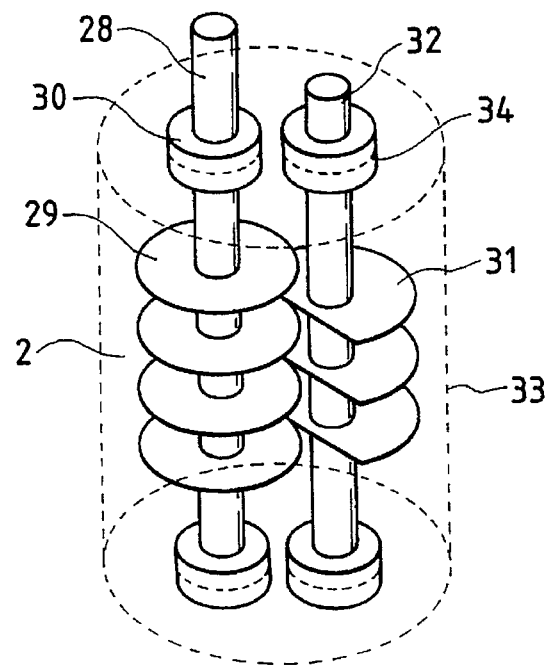
FIG. 11 is a diagram illustrating another conventional braking device.
Figure 12:
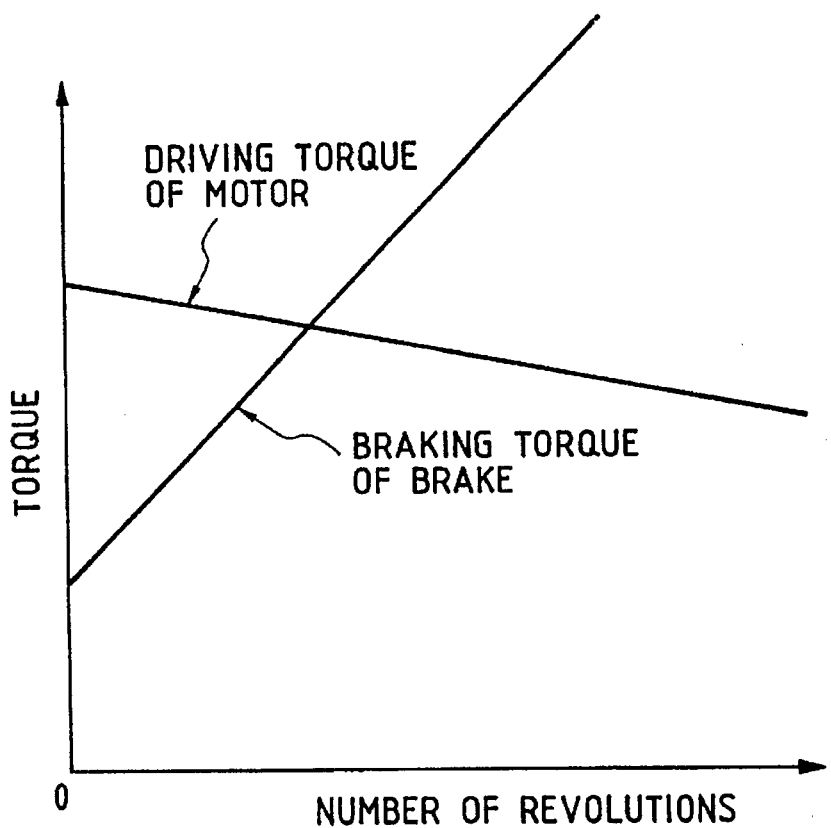
FIG. 12 is a graph showing the relationship between the number of revolutions and torque according to the present invention.
Figure 13:
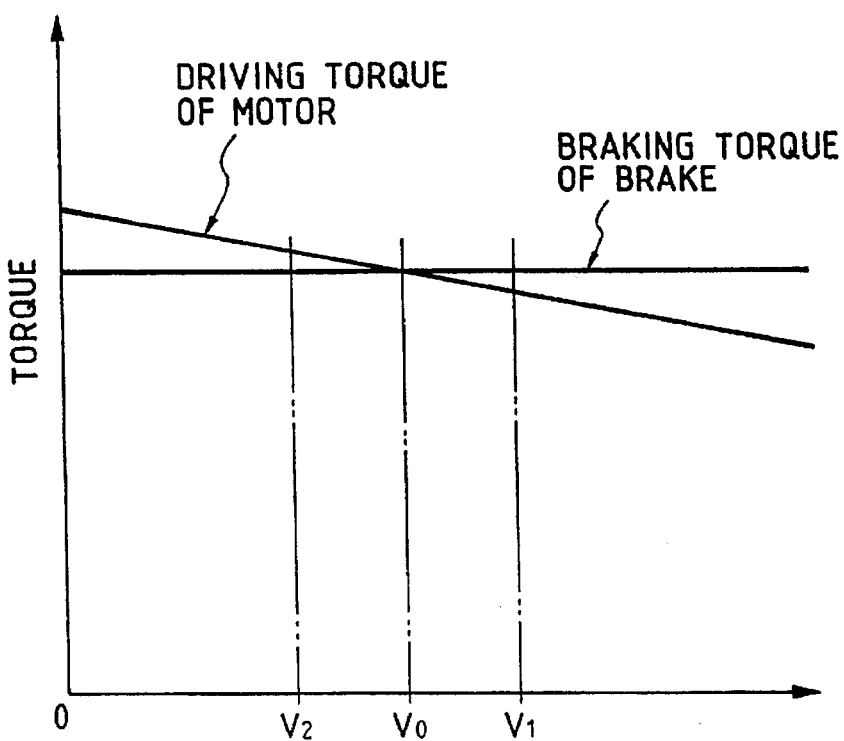
FIG. 13 is a graph showing the relationship between the number of revolutions and torque for the braking device in the conventional art.

Since the braking device 101 generates a braking torque that is proportional to the number of revolutions of the prime mover 104, the same effect as is obtained by applying negative feedback to the prime mover can be provided. Therefore, not only the number of revolutions but also the rotational angle of the shaft 105 can be controlled. In addition, as a sealing mechanism is not provided, the braking torque at revolution 0 in FIG. 3 is smaller than that in FIG. 11, which represents the torque-revolutions characteristic in the second conventional art example. Since there is no portion where friction due to the rubbing together of solid objects occurs, a stick-slip that especially deteriorates the useability during low-speed operation seldom occurs.

Figure 4:
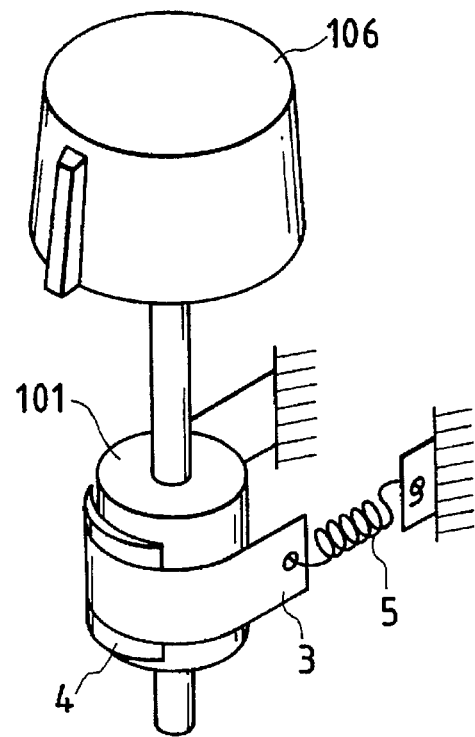
FIG. 4 is a diagram illustrating another embodiment of the present invention.

FIG. 4 is a perspective view of an additional embodiment of the present invention. Reference number 101 denotes a braking device which has the arrangement that is illustrated in FIG. 1, and 106 denotes a knob for the manipulation of a device. By connecting the knob 106 to the braking device 101, not only can the operating force be adjusted in consonance with an application and the desires of an operator, but also the characteristic of the braking device 101 can be adjusted so that it is proportional to the braking torque and the operation speed. Thus, an operator can acquire preferable sensations during operations, and as previously described, the same effect that is obtained by applying feedback to the operation speed can be provided to ensure precise operation of the device.

Figure 5:
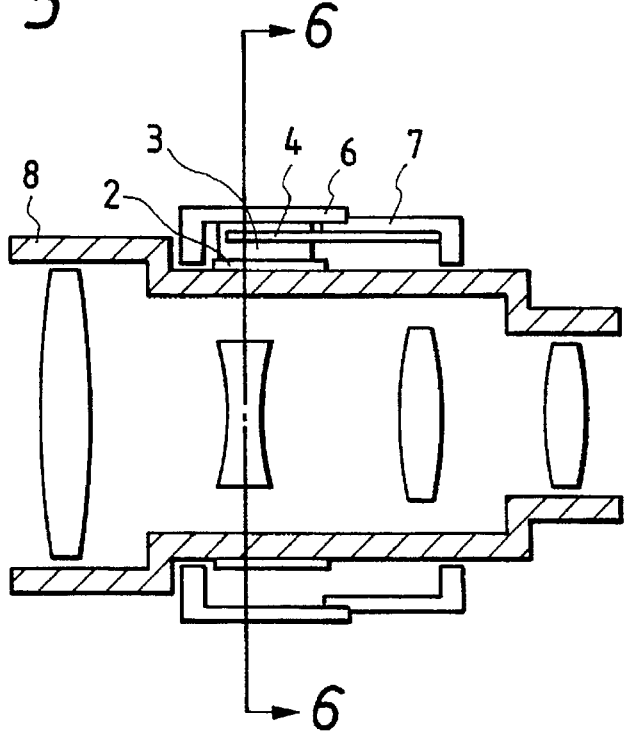
FIG. 5 is a diagram illustrating a zoom lens barrel to which the device of the present invention is applied.
Figure 6:
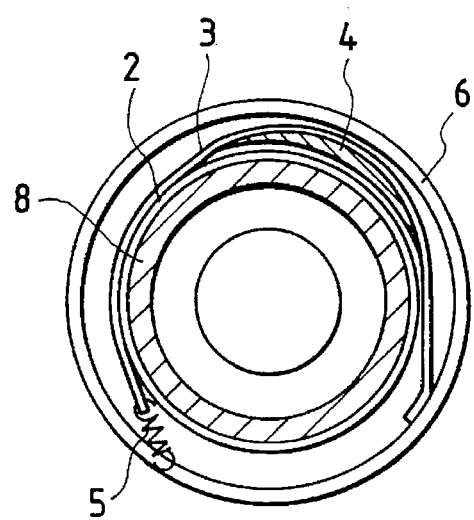
FIG. 6 is a cross sectional view taken along line 6—6 in FIG. 5.

FIG. 5 illustrates a vertical cross sectional view of a further embodiment of the present invention; and FIG. 6, illustrates horizontal cross sectional view taken along the line 6—6 in FIG. 5, the braking device that is structured as is shown in FIG. 1 and that is applied to an operational section for a cylindrical lens, such as a handy lens for a television lens.

In FIGS. 5 and 6, reference number 2 denotes Newtonian fluid; 3, a thin plate; 4, a spacer; and 5, a spring. An operational ring 6 is coupled with the thin plate 3 to facilitate interlocking with an optical system. An operating force setting ring 7 is employed to hold the spacer 4 and to so change the angle of the spacer 4 relative to the operational ring 6 that the spacer 4 is moved around the operational ring 6. A lens body 8 is called an internal cylinder (lens barrel). The operational ring 6 and the operating force setting ring 7 are supported rotatably around the center of the internal cylinder 8.

The embodiment shown in FIGS. 5 and 6 is the equivalent of an application where the cylindrical member 1 in FIG. 1 is stationary and the other members are rotated. The internal cylinder 8 in FIGS. 5 and 6 corresponds to the cylindrical member 1 in FIG. 1. When the operational ring 6 and the operating force setting ring 7 are rotated together, a braking torque that is proportional to the number of revolutions of the operational ring 6 is generated due to the property of the Newtonian fluid 2. By changing the angle relationship formed with the operating force setting ring 7 and the operational ring 6, the positional relationship between the thin plate 3 and the spacer 4 is altered, and accordingly, the area where the thin plate 3 contacts the Newtonian fluid 2 is varied. The braking torque is thereby changed.

Figure 7:
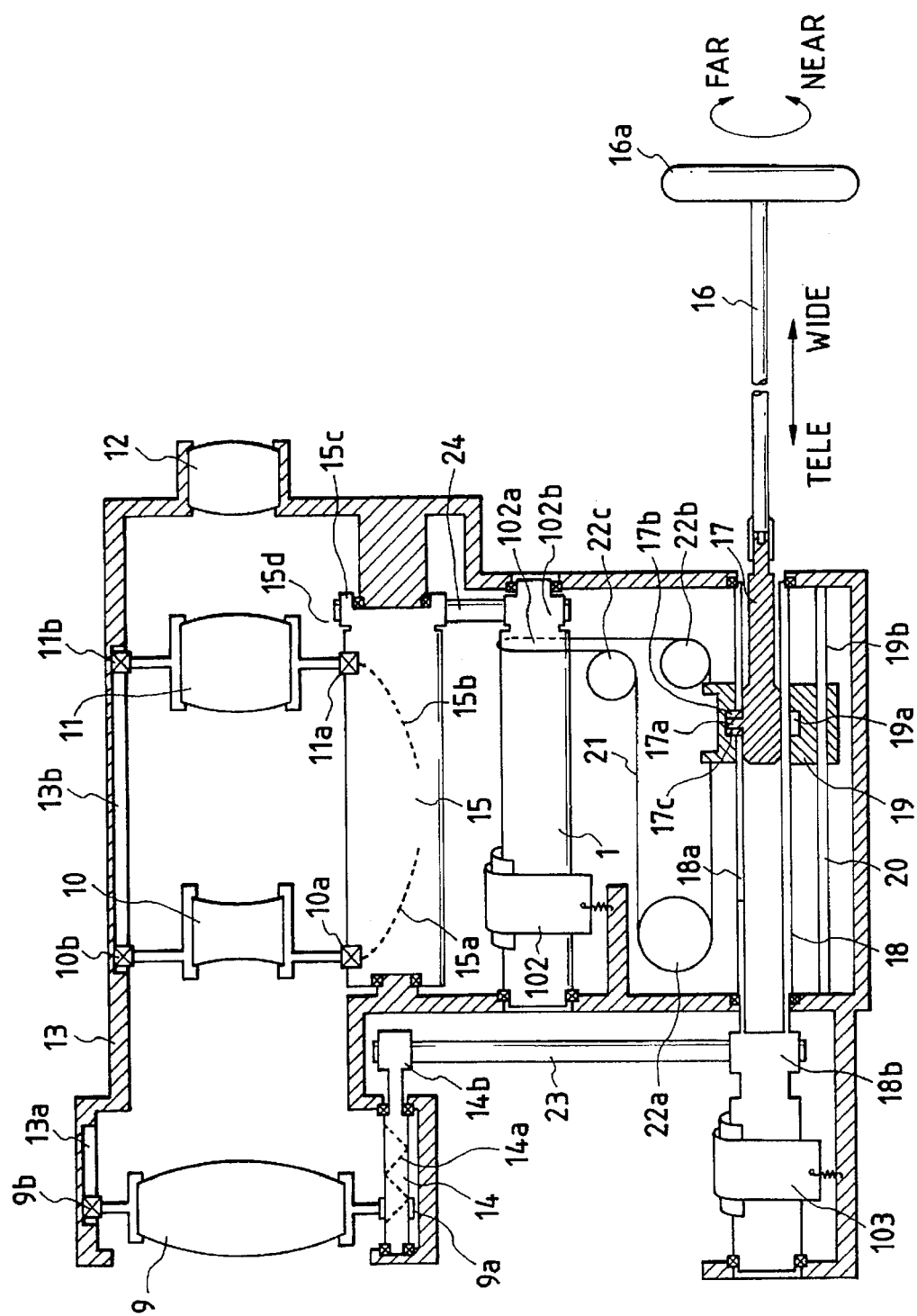
FIG. 7 is a diagram illustrating a first embodiment of a television lens to which the device of the present invention is applied.

FIG. 7 is a vertical cross sectional view of still another embodiment of the present invention, wherein the braking device in the first embodiment is employed in a control section for a single-shaft, dual-operation zoom lens, such as a large lens for a television lens.

In FIG. 7, an in-focusing lens Group 9, a zoom type variator lens group 10 for variable magnification, a zoom type compensator lens group 11 for compensation, and image relay lens groups 9 to 12 are supported by a lens body 13. An internal thread 9a that engages an external thread 14a of a helicoid 14 is provided at one end of a support lens-barrel of the focusing lens group 9. At the other end is provided a rotary member 9b that is fitted into a linear groove 13a that is formed along the lens body 13. The focusing lens group 9 is shifted in the direction of an optical axis as the helicoid 14 is rotated.

Rotary members 10a and 11a that are fitted in respective cam grooves 15a and 15b, which are provided in a cylindrical cam 15 in consonance with an optical system, are attached to the ends of the support lens-barrel of the zoom type variator lens group 10 and the zoom type compensator lens group 11. Rotary members 10b and 11b that are fitted into a linear groove 13b, which is provided along the lens body 13, are attached to the other ends of the support lens-barrel. The lens groups 10 and 11 are shifted in the direction of an optical axis as the cylindrical cam 15 rotates.

Rotary members 17b and 17c are provided around a convex portion 17a of a slide shaft 17. The rotary member 17b is fitted into a linear groove 18a that is formed in a rotary cylinder 18 so that it is parallel to the slide shaft 17. The rotary member 17c is fitted into a cylindrical groove 19a that is formed in a slider 19 that has an internal diameter that enables it to be fitted around the outer diameter of the rotary cylinder 18. A hole 19b in the slider 19 is fitted around a shaft 20 to prevent the rotation of the slider 19, and a wire 21 that is attached to both ends of the slider 19 is wound around a drum 102a via pulleys 22a, 22b, 22c that change the direction of its travel.

With the above described structure, the linear displacement, in a direction that is indicated by the arrow, of the slide shaft 17, which is connected to one end of an operation rod 16, is transmitted to the sliding body 19 via the rotary member 17c, and the rotation of the drum 102a, which is formed together with the cylindrical member 1 of a zoom type braking device 102, is performed by the wire 21.

As the drum 102a is rotated, the cylindrical cam 15 is driven via a belt pulley 102b that is coupled with the zoom braking device 102 by a belt 24, and a belt pulley 15c.

The rotation of the sliding shaft 17 is transmitted via the rotary member 17b to a belt pulley 18b that is fitted around the rotary cylinder 18. The rotational force drives a belt pulley 14b via a timing belt 23 while at the same time actuating a focusing braking device 103.

With the above described structure, zooming for a single-shaft dual-operation zoom lens is performed by tele and wide operation of a grip 16a on the operation rod 16, and focusing is performed by the clockwise (far) rotation and the counterclockwise (near) rotation of the grip 16a. Since the zoom braking device 102, which has the same structure as that of the braking device in FIG. 1, is linked with the cylindrical cam 15, and since the focusing braking device 103 is linked with the helicoid 14, the zooming and the focusing operating force can be varied in consonance with an operator's desire and the exposure conditions, and the operating force can be changed in consonance with the operation speed to acquire a preferable useability level.

Figure 8:
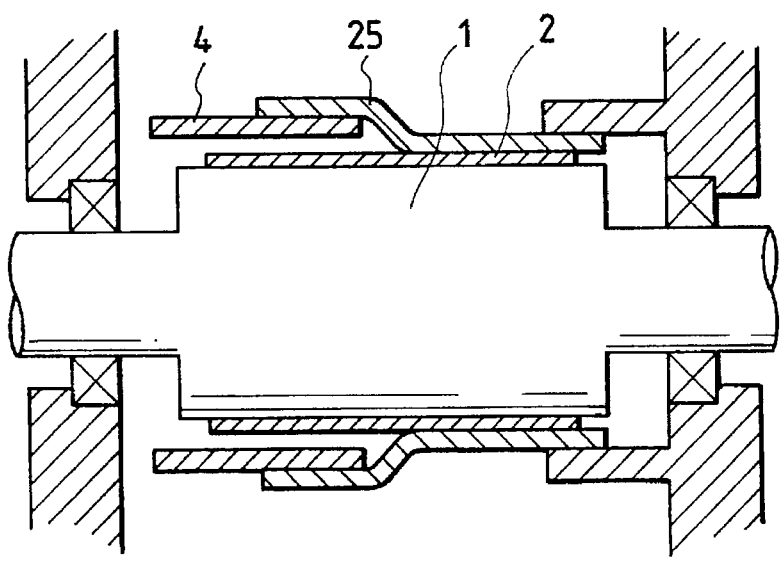
FIG. 8 is a diagram illustrating an additional embodiment of the present invention.

FIG. 8 is a cross sectional view of another braking device taken along its rotary shaft. In FIG. 8, reference number 1 denotes a cylindrical member; 2, Newtonian fluid that is deposited on the cylindrical surface of the cylindrical member 1; 25, a flexible cylindrical member, which is positioned so that it encircles the cylindrical member 1 and bounded in a direction of the shaft of the cylindrical member 1. The flexible member 25 is formed of, for example, rubber. A spacer 4 is supported so that it can move freely along the shaft while not contacting the cylindrical member 1. The spacer 4 in this embodiment may have an arc shape or cylindrical shape.

As is shown in FIG. 8, when the cylindrical member 1 is rotated by an external force while a part of the cylindrical, flexible member 25 is in contact with the Newtonian fluid 2, shearing strain is induced in the Newtonian fluid 2. At this time, because of the property of the Newtonian fluid 2, a braking force that is proportional to the speed of the shearing strain is generated between the cylindrical member 1 and the cylindrical, flexible member 25. Since the velocity in the shearing strain is proportional to the number of revolutions of the cylindrical member 1, the braking device generates a braking torque that is proportional to the number of revolutions of the cylindrical member 1. Further, as the spacer 4 is shifted along the shaft Of the cylindrical member 1, the interval between a part of the cylindrical, flexible member 25 and the cylindrical member 1 is changed and the area where the cylindrical, flexible member 25 contacts the Newtonian fluid 2 is also varied. Because of the property of the Newtonian fluid 2, the braking torque of the braking device is proportional to the contact area.

The braking device in this embodiment is symmetric relative to the rotational direction of the cylindrical member 1, while the braking device in the first embodiment is asymmetric. Therefore, a difference in characteristics that is due to the rotational direction of the cylindrical member 1 seldom occurs.

Although in this embodiment the members are located around the cylindrical face, the members can be located inside the cylinder by coating the internal surface of a hollow cylinder with the Newtonian fluid 2.

Figure 9:
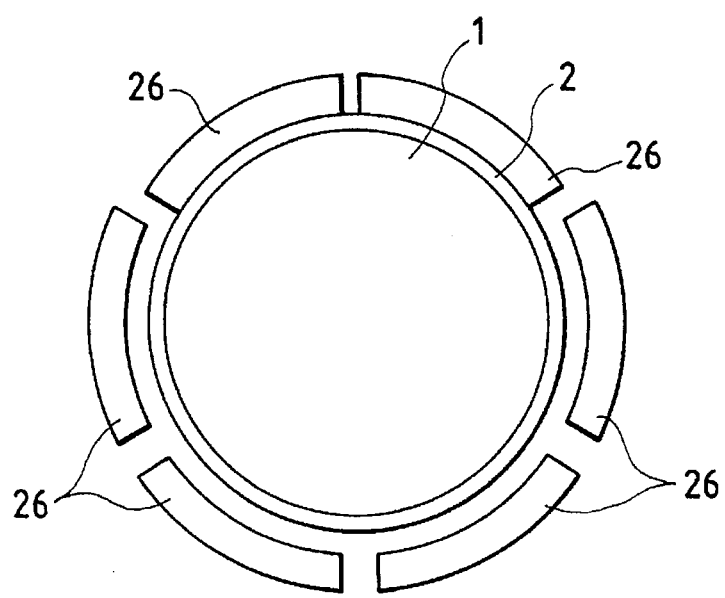
FIG. 9 is a diagram illustrating a further embodiment of the present invention.
Figure 10:
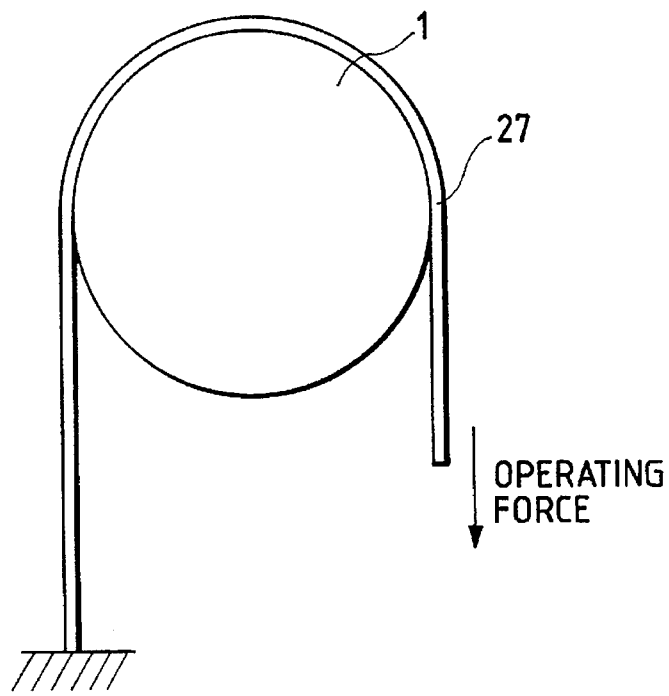
FIG. 10 is a diagram illustrating a conventional braking device.

FIG. 9 is a horizontal cross sectional view of a still further embodiment of the present invention, that is taken perpendicularly to its rotary shaft.

In FIG. 9, Newtonian fluid 2, such as oil or grease, is deposited on the cylindrical surface of a cylindrical member 1, and one or more contact members 26 are located around the external surface of the cylindrical member 1 and bounded in the circumferential direction of the cylindrical member 1. When the cylindrical member 1 is rotated by external force while. the contact members 26 partially contact the Newtonian fluid 2, shear strain is induced in the Newtonian fluid 2. Because of the property of the Newtonian fluid 2, braking force that is proportional to the velocity of the shearing strain is generated between the cylindrical member 1 and the contact members 26. Since the speed of the shearing strain is proportional to the number of revolutions of the cylindrical member 1, as a result, the braking device generates a braking torque that is proportional to the number of revolutions of the cylindrical member 1. By altering the interval between the contact members 26 and the cylindrical member 1, whether or not the contact members 26 contact the external surface of the cylindrical member 1 is determined. Therefore, the total contact area of the cylindrical member 1 is changed. The braking torque of the braking device is proportional to the total contact area because of the property of the Newtonian fluid 2.

While the spacer is required in the preceding embodiments, it is not required in this embodiment. In addition, while the setting of the operating force is sequentially performed in the fourth and sixth embodiments, the setting can be performed step by step in this embodiment.

As is described above, according to the present invention, the members are located, in consonance with the application of the Newtonian fluid, either inside or around the cylindrical member so that, to vary the braking force, the contact area of the cylindrical member is changed. In a braking device with this arrangement, the braking torque can be proportional to the number of revolutions, and by changing the proportion ratio the braking torque can be varied while the number of revolutions remains the same.

Figure 14:
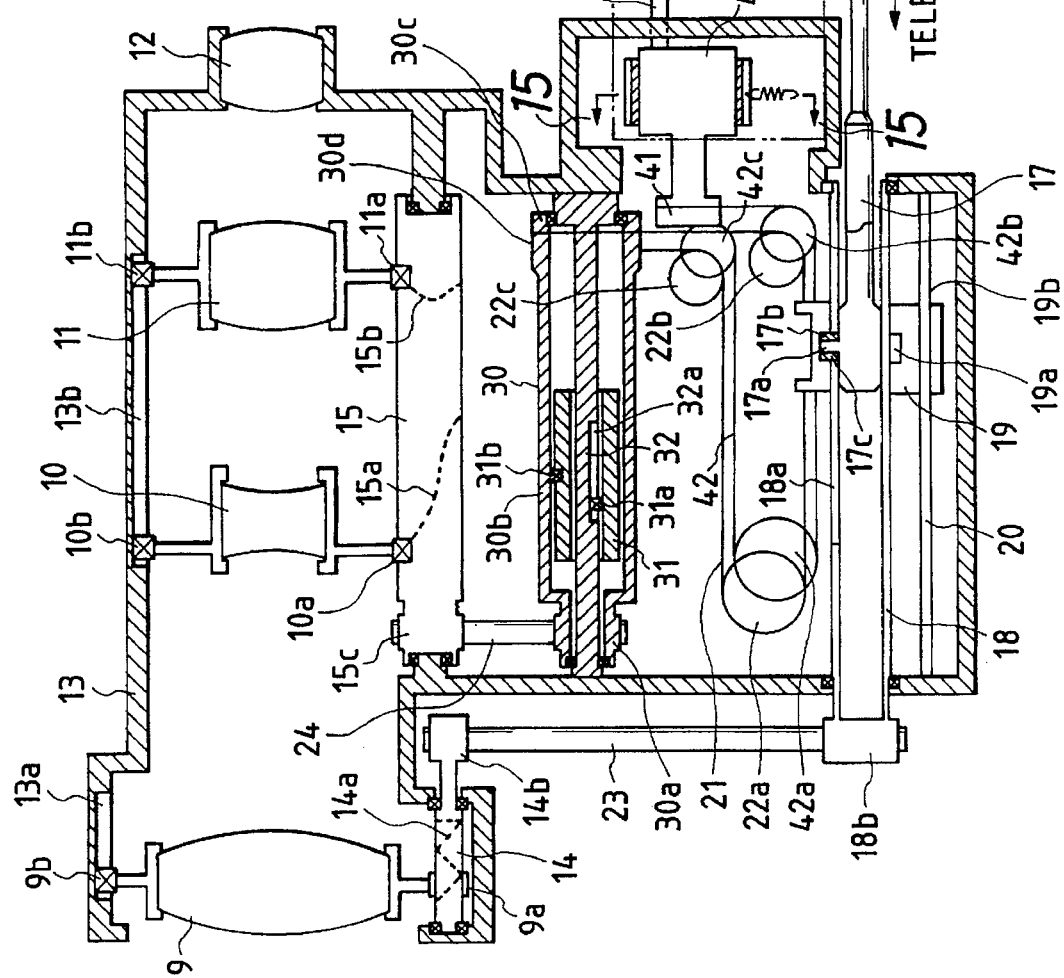
FIG. 14 is a diagram a second embodiment of a television lens to which the device of the present invention is applied.

Another embodiment wherein the television lens in FIG. 7 is improved will now be explained while referring to FIGS. 14 and 15. Those components that are denoted by the same reference numbers as are used in the previous embodiments have corresponding functions. In the embodiment shown in FIGS. 14 and 15, a zoom operation can be varied.

A cylindrical cam 15 interlocks with a counterbalance case 30 via a pulley 15c that is coupled with the cylindrical cam 15, a belt 24, and a pulley 30a, which is coupled with the counterbalance case 30. A rotary member 30b engaged with a cam groove 31b, which is formed in a counterbalance 31, is provided in the counterbalance case 30. A rotary member 31a is formed in the counterbalance 31 so that it is fitted into a linear groove 32a that is formed in a counterbalance shaft 32. The counterbalance 31 is moved linearly in a direction of an optical axis in consonance with the rotation of the counterbalance case 30.

The cam groove 31b that is formed in the counterbalance 31 is so shaped that when an entire lens is inclined, the gravitational force that acts on a zoom type variator lens group 10 and a compensator lens group 11, and the gravitational force that acts on the counterbalance 31 offset each other.

The linear movement of a sliding shaft 17 drives, via a wire 42, a pulley 41 that is linked with a brake drum 40a. Pulleys 42a, 42b, and 42c change the direction of travel of the wire 42.

Figure 15:
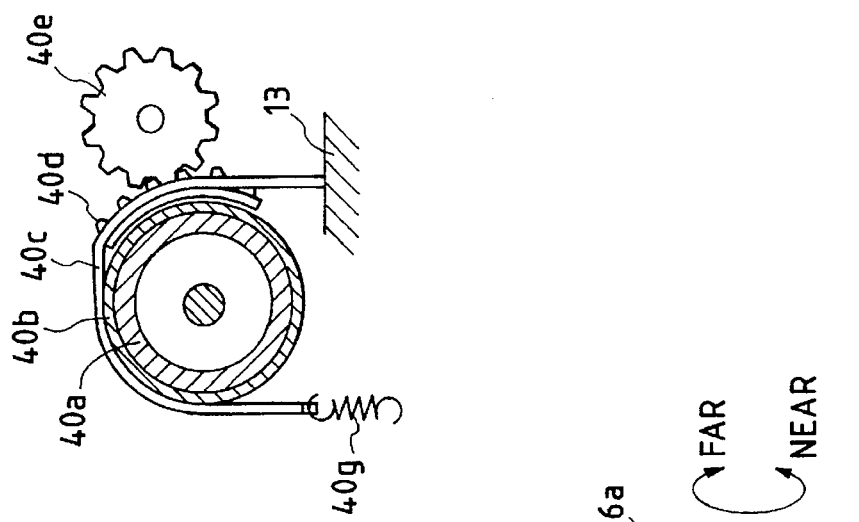
FIG. 15 is a diagram illustrating an operating force varying mechanism for the device shown in FIG. 14.

As is shown in FIG. 15, when the braking drum 40a is rotated, grease 40b that is applied to the surface of the brake drum 40a acts on an operating force setting brake 40 to generate a braking torque that is in consonance with the contact area for a brake belt 40c and the grease 40b.

Since a gear 40e is linked via a shaft to a control setting knob 40f and engages a gear formed at the outer circumference of a spacer 40d, the spacer 40d is interlocked with the rotation of the operating force setting knob 40f and is moved around the brake drum 40a. In consonance with the position of the spacer 40d, a part of the brake belt 40c, which is so held by a spring 40g that it is close to the brake drum 40a, is separated from the brake drum 40a, and the area where the brake belt 40c contacts the grease 40b is changed. With such a structure, by turning the operating force setting knob 40f from the outside of a lens body 13, the operating force for zooming can be changed.

As is described above, in this embodiment the contact area of the brake belt 40c and the brake drum 40a can be changed by adjusting the operating force setting knob 40f, and the operating force for zooming can be varied according to the needs of a photographer.

Figure 17:
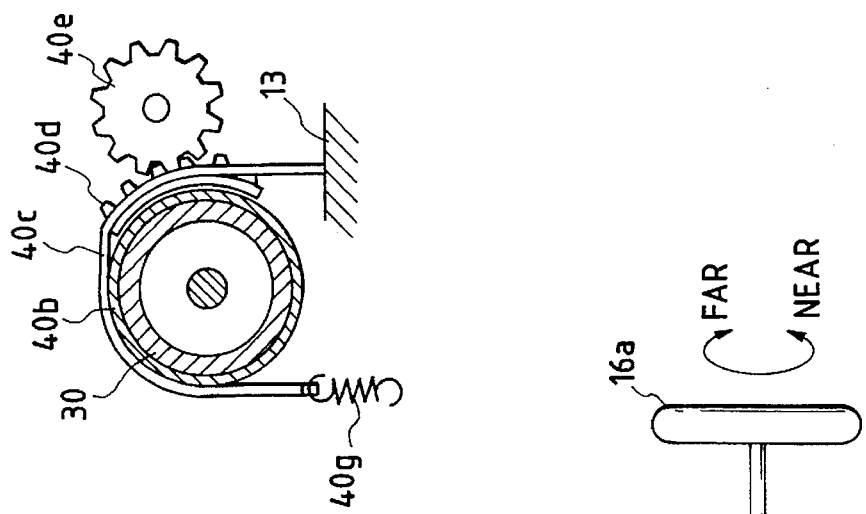
FIG. 17 is a diagram illustrating an operating force varying mechanism for the device in FIG. 16.

In the preceding embodiments, a spacer is located for the provision of an operating force setting member 40. A braking device that is made more compactly than those in the previous embodiments is shown in FIGS. 16 and 17 for the following embodiment.

Figure 16:
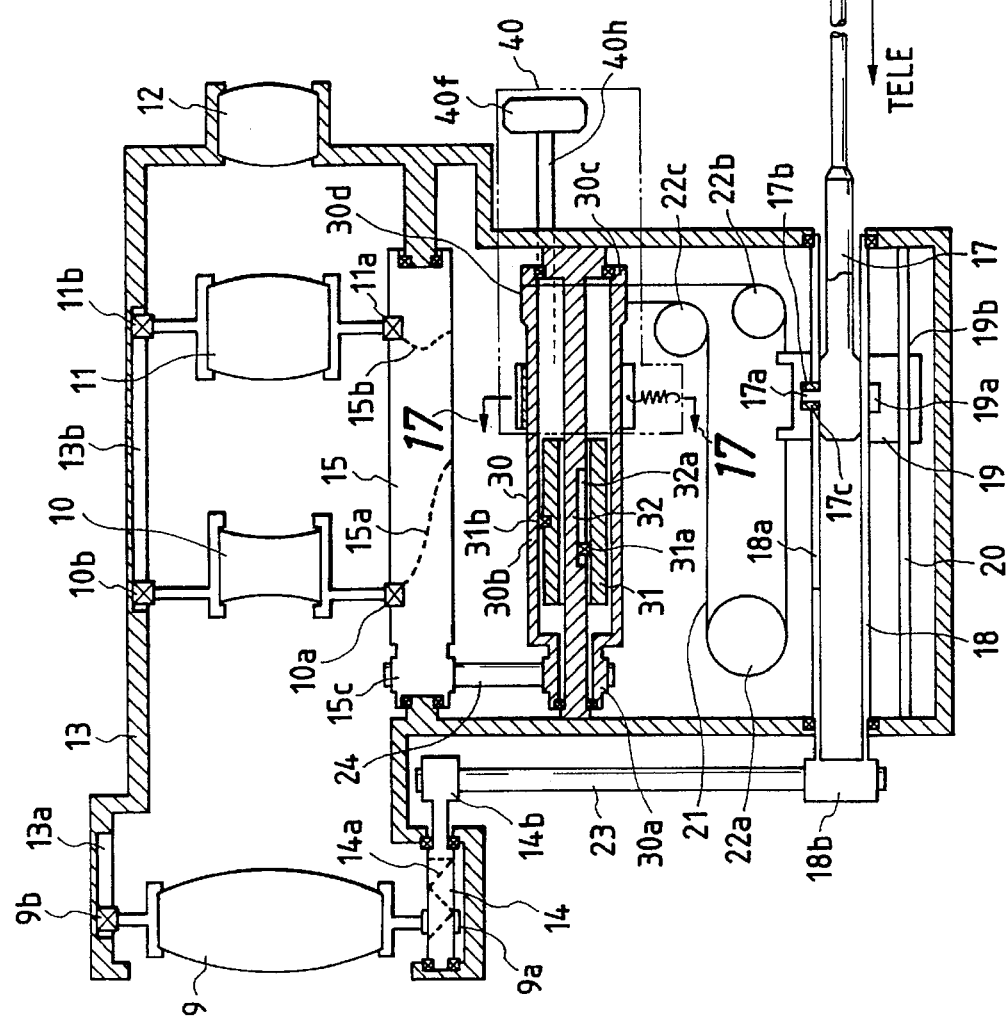
FIG. 16 is a diagram illustrating an improved example of the device in FIG. 14.

In this embodiment, as is shown in FIG. 16, an operating force setting brake 40 is directly linked to a counterbalance case 30 that also serves as a brake drum, which is a driven member of a brake. Grease 40b is deposited on the surface of the counterbalance case 30, as is shown in FIG. 17. Due to the action of the grease 40b, a braking torque is generated in consonance with the area of the grease 40b that is contacted by a brake belt 40c.

A gear 40e is coupled to an operating force setting knob 40f via a shaft 40h and engages a gear that is formed at the circumference of a spacer 40d. Through the gear 40e, the spacer 40d is interlocked with the rotation of the operating force setting knob 40f and moves around a center of a counterbalance case 30. In consonance with the position of the spacer 40d, part of the brake belt 40c, which is so held by a spring 40g that it is close to the counterbalance case 30 that also serves as a brake drum, is separated from the counterbalance case 30. Thus, the area of the grease 40b that is contacted by the brake belt 40c is changed.

With this structure, when the operating force setting knob 40f is turned from outside of a lens body 13, the operating force for zooming can be altered.

Members that are used in common with the driven members of a brake are not limited to the counterbalance case 30, but may be other rotary members that constitute a lens control section, such as a cylindrical cam, a rotary cylinder and belt pulleys 14b, 15c, and 30a, or pulleys 22a, 22b, 22c, and helicoid 14.

Although the operating force for zooming is variable in this embodiment, a structure is easily provided where the operating force for focusing and the opening and closing of an iris is variable. One embodiment of such a structure will now be described.

Figure 19:
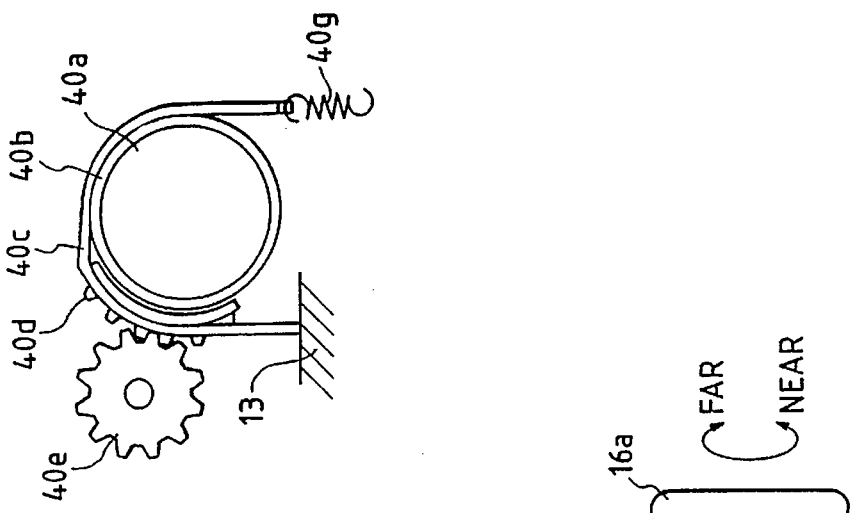
FIG. 19 is a diagram illustrating an operating force varying mechanism for the device in FIG. 18.
Figure 18:
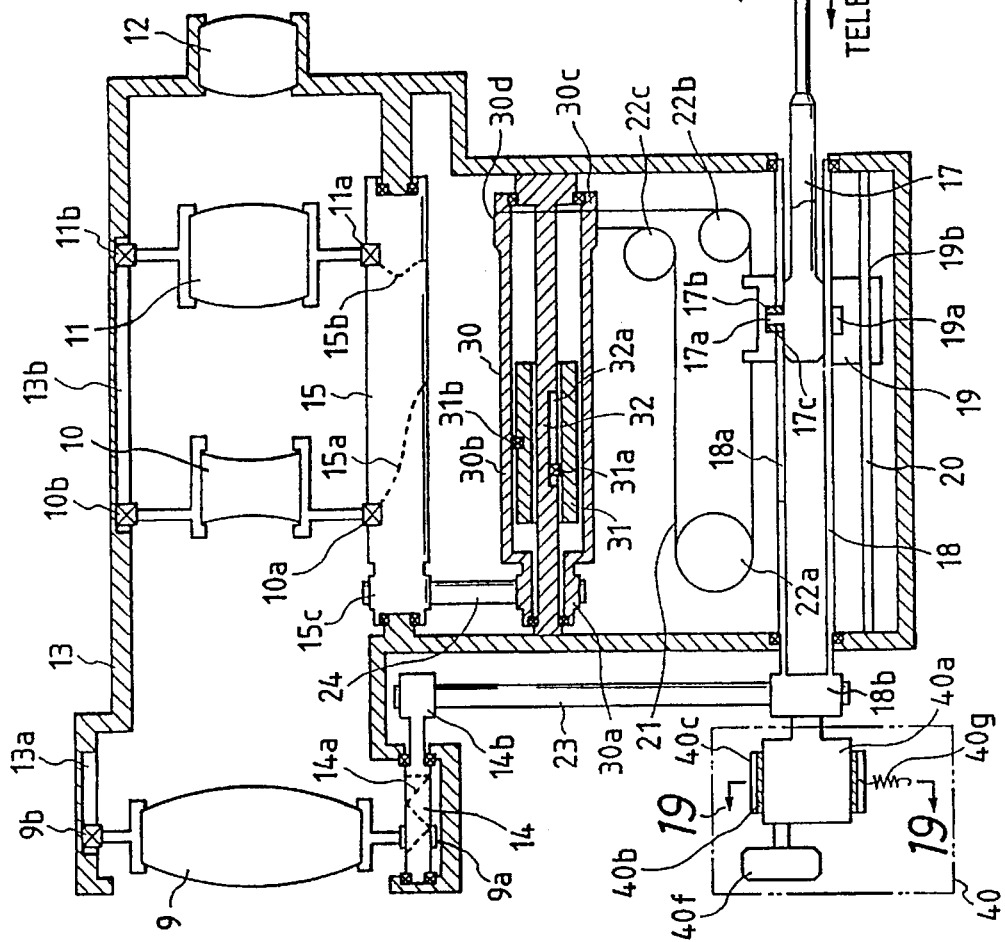
FIG. 18 is a diagram illustrating a focusing lens adjusting mechanism, for a television lens, to which the device of the present invention is applied.

FIG. 18 is a vertical cross sectional view of an optical device according to yet another embodiment of the present invention, and FIG. 19 is a horizontal cross sectional view taken along the line 19—19 in FIG. 18. The same reference numbers as are used in FIGS. 16 and 17 are used to denote components that have corresponding or identical functions, and an explanation for them will not be given.

In FIGS. 18 and 19, in an operating force setting brake 40, a brake drum 40a, a driven member, is so coupled with a rotary cylinder 18 that it rotates during focusing, and a grease 40b is deposited on the surface of the brake drum 40a. The grease 40b on the brake drum 40a acts to generate a braking torque that is in consonance with an area of the grease 40b that is contacted by a brake belt 40c. A gear 40e is linked to an operating force setting knob 40f with a shaft and engages a gear that is formed at the circumference of a spacer 40d. Through this gear 40e, the spacer 40d is interlocked with the rotation of the operating force setting knob 40f and moves around the brake drum 40a. In consonance with the position of the spacer 40d, a part of the brake belt 40c is separated from the brake drum 40a, and the area where the brake belt 40c is in contact with the grease 40b is changed. With this structure, the operating force setting knob 40f is turned from the outside of a lens body 13 to change the operating force for focusing.

As is described above, according to the present invention, since the driven member of the operating force setting brake is coupled with the rotary members that constitute the lens control section, while requiring a reduced number of items, it is possible to provide an optical device that is compact and for which the operating force can be varied.

An explanation has been given for the embodiments where the braking device of the present invention is applied in the construction of a comparatively large television lens. An embodiment where the device of the present invention is applied in the construction of a compact, handy type zoom lens will now be explained while referring to FIGS. 20 and 21.

Figure 20:
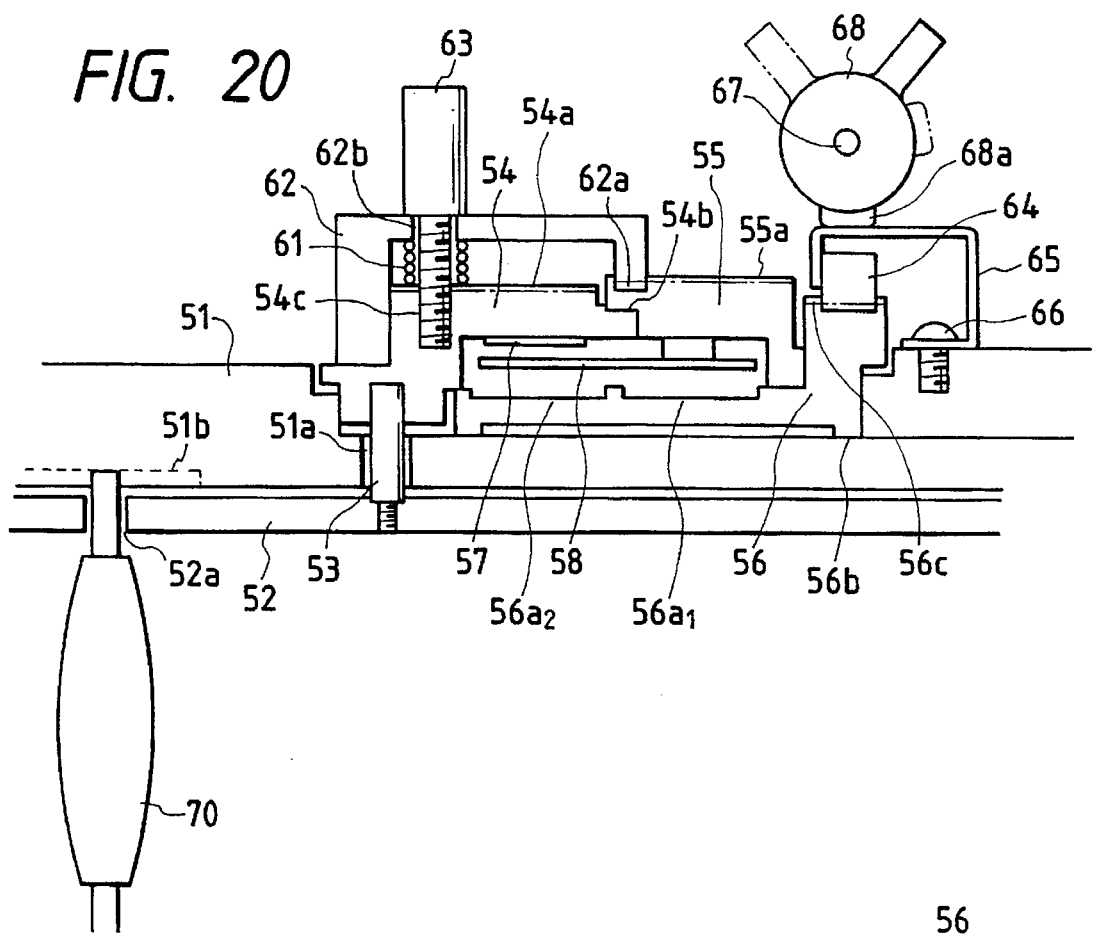
FIG. 20 is a diagram illustrating a handy lens to which the device for the present invention is applied.
Figure 21:
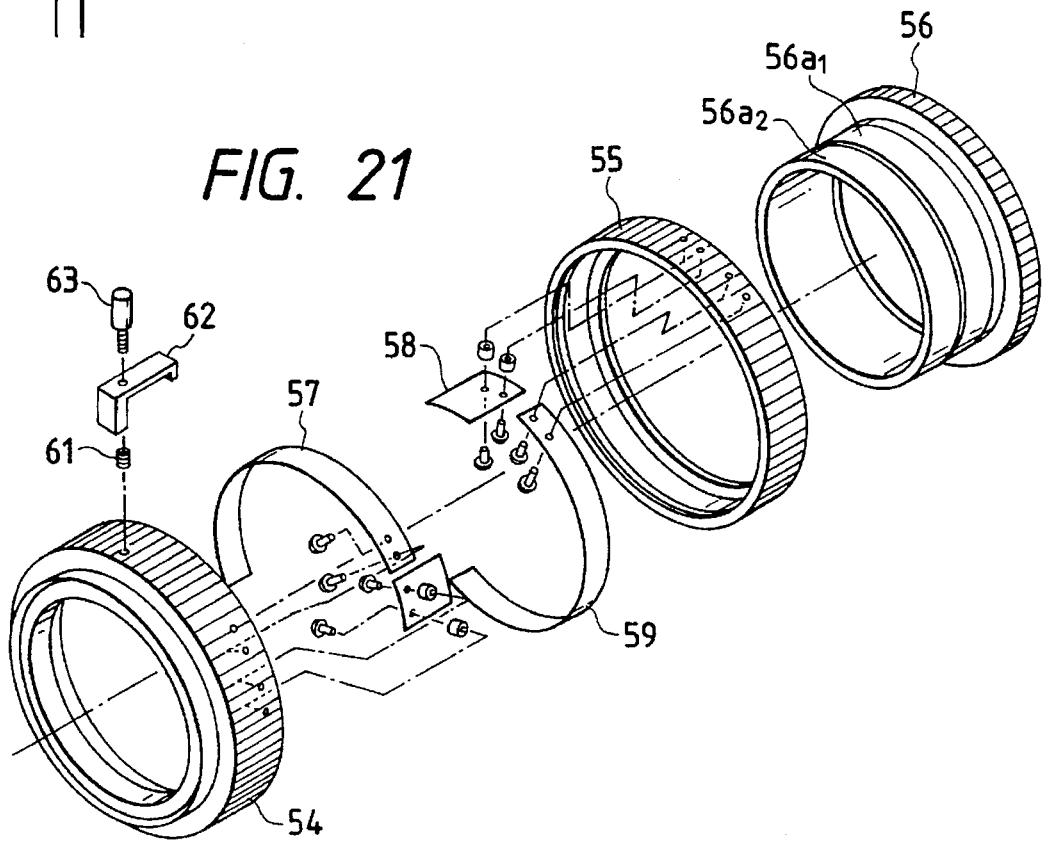
FIG. 21 is an exploded, perspective view of an essential portion of the device in FIG. 20.

FIG. 21 is an exploded perspective view of an essential portion in a side cross-sectional view of a lens barrel in FIG. 20.

A cam cylinder 52 that moves a zoom lens group unit 70 in a direction of an optical axis is provided rotatably within a fixed cylinder 51 of a lens barrel. A cam groove 52a is formed in the cam cylinder 52. A linear groove 51b is formed along the optical axis in the fixed cylinder 51. One end of a cam cylinder drive pin 53 is externally attached to the fixed cylinder 51 so that it projects externally through a long hole 51a that is formed in the fixed cylinder 51. The outer end of the cam cylinder drive pin 53 is fitted into a first operational ring 54 that has a gear 54a at its outer diameter.

An operating force adjusting ring 55 that has a plain knurled surface 55a at its circumference is provided on the right side of the first operational ring 54 so that it overlaps a circular protrusion 54b of the operational ring 54. A second operational ring 56 is located inside the rings 54 and 55, and upper sliding faces 56a1 and 56a2 and a lower sliding face 56b are lubricated with grease.

A flexible, thin, friction force generation plate 57, which has a nearly flat shape having elasticity before assembly, is so located at a gap between the first operational ring 54 and the second operational ring 56, that the plate 57 can be wound around the second operational ring 56. As is shown in FIG. 21, one end of the friction force generation plate 57 is secured to the lower face of the first operational ring 54 while the other end is in contact with the sliding face 56a2 of the second operational ring 56. Inside the operating force adjusting ring 55, a contact area control plate 58 is so located that it separates the friction force generation plate 57 from the sliding face 56a2 of the second operational ring 56. When the relative angle formed by the first operational ring 54 and the operating force adjusting ring 55 is changed, the contact area control plate 58 is employed to vary the area of the friction force generation plate 57 that is in contact with the second operational ring 56.

Similarly, a friction force generation plate 59, which is secured at one end to the internal surface of the operating force adjusting ring 55, is located at a gap between the operating force adjusting ring 55 and the second operational ring 56. A contact area adjusting plate 60, which is secured to the internal surface of the first operational ring 54, is employed to ensure the adjustment of the area where the friction force generation plate 59 contacts the sliding face 56a1 of the second operational ring 56.

Figure 22A:
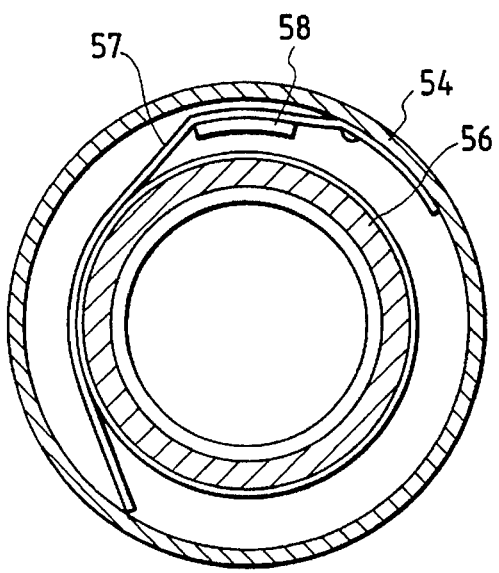
FIGS. 22A and 22B are cross sectional views of essential portions of the device of the present invention.
Figure 22B:
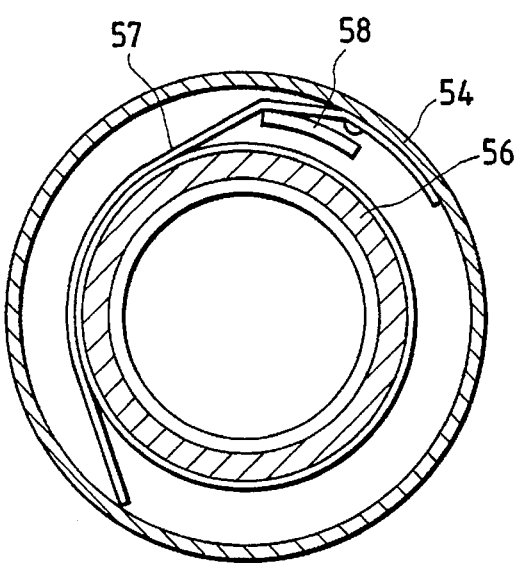

FIGS. 22A and 22B are cross sections of the device in FIGS. 20 and 21, as viewed from the front. The cross sectional view in FIG. 22B especially shows the state where the contact area adjusting plate 58 is shifted by the rotation of the operating force adjusting ring 55. As is shown, it is possible for the contact area to be changed and the operating force to be varied by adjusting the contact area adjusting plate 58.

An operating force fixture 62 that is forced upward by a spring 61 is attached to the top of the first operational ring 54. A wedge 62a that is formed at the end of the operating force fixture 62 is therefore fitted into the plain knurled surface 55a of the operating force adjusting ring 55. An operating force setting knob 63 is passed through a hole 62b that is formed in the operating force fixture 62, and is secured via a spring 61 to an external thread 54c that is formed in the first operational ring 54.

A leaf spring 65 that pushes the wedge 64 upward is fixed to the fixing cylinder 51 by a machine screw 66, so that the wedge 64 can be fitted into a plain knurled external surface 56c of the second operational ring 56. Above the wedge 64 is provided a manual/electric switching knob 68 that is supported rotatably by a shaft 67, and that has a protrusion 68a with which to press down the leaf spring 65. In this embodiment, the manual/electric switching knob 68 has a function that permits switching from manual operation to electric operation.

During the electric operation, when the manual/electric switching knob 68 is turned to the position indicated by the dotted line in FIG. 20, the wedge 64 is shifted upward by the leaf spring 65 and is disengaged from the plain knurled surface of the second operational ring 56, which can then be rotated freely. At the same time, the driving force of a motor (not shown) is ready to be transmitted to the first operational ring 54.

When a voltage is applied to the motor under this condition, the driving force is transmitted to the first operational ring 54. As the first operational ring 54 is rotated by this force and the cam cylinder 52 is also rotated via the cam cylinder drive pin 53, the lens group 70 can be driven electrically. At this time, since the second operational ring 56 is smoothly moved with only one of the sliding faces $56a_1$, $56a_2$ and $56b$, whichever has the smaller sliding resistance, the operation can be performed with a minimum of operational torque.

During the manual operation, when the manual/electric switching knob 68 is turned to the position indicated by the solid line in FIG. 20, the protrusion 68a of the knob 68 presses the leaf spring 65 down and the wedge 64 secures the second operational ring 56 by engaging its plain knurled surface. When the first operational ring 54 is manually rotated under this condition, the cam cylinder 52 is rotated via the cam cylinder drive pin 53 and the lens group 70 is accordingly driven.

At this time, the second operational ring 56 is not rotated, and the operating force generation plates 57 and 59 slide across the respective sliding faces 56a1 and 56a2 of the second operational ring 56. Sliding resistance is encountered by the second operational ring 56 in consonance with the areas in which it is in contact with the friction force generation plates 57 and 59. Therefore, as a photographer rotates the first operational ring 54, an operational torque is generated at the first operational ring 54 in consonance with the sliding resistance that is encountered relative to the second operational ring 56.

To adjust the amount of the operational torque that is to be generated, first, the operating force setting knob 63 is loosened. Then, the operating force fixture 62 is moved upward by the spring 61, and the wedge 62a of the operating force fixture 62 is disengaged from the plain knurled surface 55a of the operating force adjusting ring 55. The operating force adjusting ring 55 is rotated freely relative to the first operational ring 54. In this condition, with the diagram in FIG. 21 viewed from the left side and along the optical axis, as the operating force adjusting ring 55 is rotated clockwise, due to the sliding resistance that is encountered on the sliding faces $56a_1$ and $56a_2$ of the second operational ring 56, the portions of the friction force generation plates 57 and 59 that have been separated from the second operational ring 56, by the contact area adjusting plates 58 and 60, are wound around the second operation ring 56. Then, the areas where the friction force generation plates 57 and 59 contact the second operational ring 56 are increased.

When the operating force setting knob 63 is again tightened and the wedge 62a of the operating force fixture 62 engages the plain knurled surface 55a of the operating force adjusting ring 55, the first operation ring 54 is rotated. Since the areas of the friction force generation plates 57 and 59 that are in contact with the second operation ring 56 are increased, the sliding resistance between the first and the second operational rings 54 and 56 is increased and the operational torque of the first operational ring 54 also becomes larger. On the other hand, when the operating force adjusting ring 55 is rotated counterclockwise, the contact area adjusting plates 58 and 60 act on the respective friction force generation plates 57 and 59 so that the plates 57 and 59 are separated from the second operational ring 56. The size of the areas where the friction force generation plates 57 and 59 contact the sliding faces $56a_1$ and $56a_2$ of the second operational ring 56 are accordingly reduced, and the operational torque of the first operational ring 54 is also decreased.

In this embodiment, not only can the operational torque be switched in two steps during the electric operation and during the manual operation, but also the operational torque can be sequentially adjusted as is desired by a photographer, and as is required for an exposure and the conditions under which an exposure is made. Further, a knob is usually provided for a zoom operational ring of a television lens for the purpose of using it as an index of a rotation angle and a reduction of operating force. When this embodiment is applied for the construction of a zoom operational ring, the operating force setting knob 63 is employed both as an index and for the reduction of the operating force, and another knob for a visual index is not required.

Further, the operating force adjusting ring 55 is sandwiched between the protrusion 54b of the first operational ring 54 and the wedge 62b of the operating force fixture 62 in order to set a relative angle between the first operational ring 54 and the operating force adjusting ring 55. The distribution of the stress that occurs as a consequence of this setting is limited to the vicinity of the wedge 62b of the operating force fixture 62. Therefore, the circular shape of the first operational ring 54 and the operating force adjusting ring 55 are maintained and a smooth operation is possible.

As is described above, the sliding of the filming device is accomplished with torques that differ for electric operation and for manual operation, and the device can be driven by a small operational torque during the electric operation, regardless of the torque that is required for the manual operation. Thus, filming can be performed with a minimum of consumed power, and filming for a longer term is possible when a battery is used as a power source. Further, for manual operation, it is possible to set a large operational torque, regardless of the torque that is required for the electric operation. A photographer can perform filming while experiencing an optimal operation sensation that is in consonance with his preferences, and the target and the conditions under which an exposure is made. Further, in a manufacturing process, delicate torque control that satisfies both electric and manual is not required.

Figure 23:
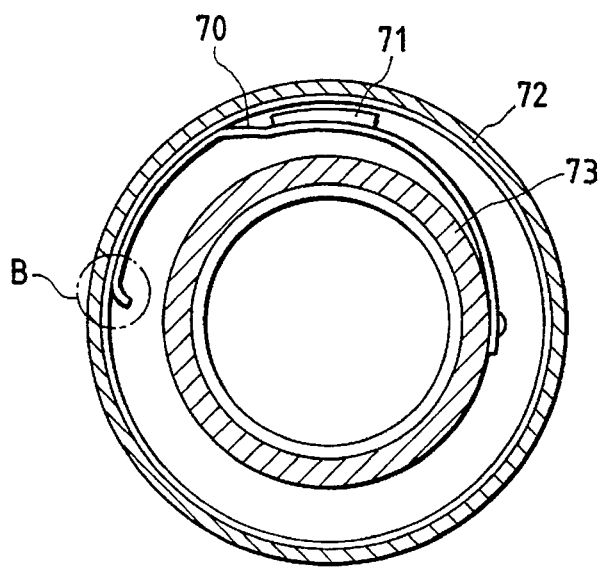
FIG. 23 is a cross sectional view of an essential portion of the device of the present invention.

As a modification of the preceding embodiment, the inverted attachment of the friction force generation plates is possible, as is shown in FIG. 23. In this modification, a viscous material is employed to coat the inside of a cylinder 72. Components 70, 71, 72, and 73 correspond to the components 57, 58, 54, and 56 in FIGS. 22A and 22B. The distal end (indicated by B) of the plate 70 is bent in this modification to prevent the viscous material from being peeled off.

As is described above, according to the present invention, since the members are located within or around a cylindrical member that is coated with a Newtonian fluid, and since the area where they contact the cylindrical member can be changed to vary the braking force, in a braking device with such a structure, the braking torque is proportional to the number of revolutions, and the braking torque can be varied by changing the proportional ratio while the number of revolutions remains the same.

What is claimed is:

1. An apparatus for varying braking force comprising:
   a cylindrical member;
   a viscous material applied to a cylindrical face of said cylindrical member to form a viscous layer;
   a contact member that contacts said cylindrical face; and
   an area changing member capable of changing an area where said contact member contacts said cylindrical face.

2. An apparatus according to claim 1, wherein said contact member and said cylindrical member are rotated relative to each other.

3. An apparatus according to claim 1, wherein said cylindrical member rotates.

4. An apparatus according to claim 1, wherein said contact member rotates relative of said cylindrical member.

5. An apparatus according to claim 1, wherein said viscous material is a paste.

6. An apparatus according to claim 1, wherein said viscous material is a liquid.

7. An apparatus according to claim 1, wherein said viscous material is an oil.

8. An apparatus according to claim 1, wherein said viscous material is a grease.

9. A lens barrel comprising:
   a rotary cylinder;
   a fixed cylinder;
   a viscous material applied to a surface of said rotary cylinder to form a viscous layer;

a contact member provided at said fixed cylinder contacting the surface of said rotary cylinder; and a lens portion which is moved in said lens barrel by rotation of said rotary cylinder.

10. A lens barrel according to claim 9, wherein said viscous material is grease.

11. A lens barrel according to claim 9, wherein said lens portion is moved with a zooming operation.

12. A lens barrel according to claim 9, wherein said viscous material is a paste.

13. A lens barrel according to claim 9, wherein said viscous material is a liquid.

14. A lens barrel according to claim 9, wherein said viscous material is an oil.

15. A lens barrel comprising:

a rotary cylinder;

a fixed cylinder;

a viscous material applied to a surface of said fixed cylinder to form a viscous layer;

a contact member provided at said rotary cylinder contacting the surface of said fixed cylinder; and a lens portion which is moved in said lens barrel by rotation of said rotary cylinder.

16. A lens barrel according to claim 15, wherein said viscous material is grease.

17. A lens barrel according to claim 15, wherein said lens portion is moved with a zooming operation.

18. A lens barrel according to claim 15, wherein said viscous material is a paste.

19. A lens barrel according to claim 15, wherein said viscous material is a liquid.

20. A lens barrel according to claim 15, wherein said viscous material is an oil.

21. A lens barrel comprising:

a rotatable cylinder;

a contact member which contacts a surface area of a cylindrical face of said rotatable cylinder;

a surface area changing member that varies a contact surface area where said contact member contacts the cylindrical face of said rotatable cylinder; and a lens unit movable in said lens barrel by rotation of said rotatable cylinder.

22. A lens barrel according to claim 21, wherein a viscous layer of a viscous material is applied to the cylindrical face of said rotatable cylinder.

23. A lens barrel according to claim 22, wherein said viscous material is oil.

24. A lens barrel according to claim 22, wherein said viscous material is a grease.

25. A lens barrel according to claim 21 wherein said lens unit is a portion of a zoom lens, and said rotatable cylinder is rotated in cooperation with a zooming operation of said zoom lens.

26. A lens barrel according to claim 21, wherein said lens unit is a focusing lens, and said rotatable cylinder is rotated in cooperation with a focusing operation of said focusing lens.

27. A lens barrel comprising:

a cylindrical member;

a contact member which contacts a surface area of a cylindrical face of said cylindrical member;

a surface area changing member that varies a contact surface area where said contact member contacts the cylindrical face of said cylindrical member;

a movable lens unit; and an operational member for moving said movable lens unit, wherein said operational member is connected to said contact member.

28. A lens barrel according to claim 27, wherein a viscous layer of a viscous material is applied to the cylindrical face of said cylindrical member.

29. A lens barrel according to claim 28, wherein said viscous material is oil.

30. A lens barrel according to claim 28, wherein said viscous material is a grease.

31. A lens barrel according to claim 27, wherein said contact member slides on the cylindrical face of said cylindrical member by operation of said operational member.

* * * * *

UNITED STATES PATENT AND TRADEMARK OFFICE
CERTIFICATE OF CORRECTION

PATENT NO. : 5,654,833  
DATED : August 5, 1997  
INVENTOR(S) : HIROSHI FUJIIKE, ET AL.

Page 1 of 2

It is certified that error appears in the above-indentified patent and that said Letters Patent is hereby corrected as shown below:

ON THE COVER PAGE:

At [19] "Fujike et al." should read --Fujiike et al.--.

At [75] "Hiroshi Fujike" should read --Hiroshi Fujiike".

COLUMN 4

Line 53, "diagram" should read --diagram illustrating--.

COLUMN 8

Line 52, "Of" should read --of--.

COLUMN 9

Line 11, "while." should read --while--.

COLUMN 14

Line 53, "of" should read --to--.

UNITED STATES PATENT AND TRADEMARK OFFICE
CERTIFICATE OF CORRECTION

PATENT NO. : 5,654,833

DATED : August 5, 1997

INVENTOR(S) : HIROSHI FUJIIKE, ET AL.

It is certified that error appears in the above-indentified patent and that said Letters Patent is hereby corrected as shown below:

COLUMN 16

Line 10, "claim 21" should read --claim 21,--.

Signed and Sealed this

Twentieth Day of January, 1998

Attest:

BRUCE LEHMAN

*Attesting Officer*      Commissioner of Patents and Trademarks